3,509,083
PROTECTIVE REPELLENT SOLUTION
Lester I. Winebrenner and James S. Knauss, Kalamazoo, Mich., assignors to U.S. Plywood-Champion Papers Inc., New York, N.Y., a corporation of New York
No Drawing. Continuation-in-part of application Ser. No. 317,066, Oct. 17, 1963. This application Mar. 15, 1967, Ser. No. 623,242
Int. Cl. C08g 51/52
U.S. Cl. 260—23.7                                    14 Claims

ABSTRACT OF THE DISCLOSURE

A protective oil-in-water emulsion for cellulose products comprising a semi-penetrating water repellent fungicide of waxes, reactive polymer, fatty acid ester, orthophenylphenol, amine fatty acid soap and other additives.

CROSS REFERENCE TO RELATED APPLICATION

This application is an improvement on and is a continuation-in-part of applicants' prior application Ser. No. 317,066, filed Oct. 17, 1963, which is incorporated herein in its entirety. Said application is now abandoned.

The present invention is concerned with a novel composition, which composition is particularly desirable for the protection of porous bodies and fibrous materials. The composition of the present invention is particularly adapted for the treatment of cellulose products such as lumber, wood, paper and related products, and effectively protects these products through the transient stages and during the periods of storage, until their ultimate use on construction or other uses. The composition of the present invention guards the cellulose products such as lumber, against swelling, shrinking, warping, checking, splitting, and the like.

The mixture or composition of the present invention also resists fungi, weathering and discoloration, and may be used with dyes in order to secure the desired colors for identification purposes, and the like. The covering or laminating composition of the present invention comprises, in essence, a mixture of paraffin wax, a petrolatum wax, reactive polymer, fatty acid ester and orthophenylphenol, emulsified with an amine fatty acid soap. Particularly desirable compositions contain effective amounts of other additive materials, in order to make the composition particularly effective in securing the results named above.

Thus, one object of the present invention is to produce a protective solution, and in particular a solution to protect cellulose products, both the natural and manufactured products, from the destructive and degrading forces of water and biological organisms. Another object of the invention is to provide a protective cellulose solution which can be applied rapidly and with ease, thereby providing a very economical and effective process. The use of heat improves the protective properties of the applied or incorporated solution. In essence, the novel protective solution of the present invention comprises a water based emulsion of a reactive polymer, fatty acid esters, waxes, a biocide, surface active agents and additives, which may be either easily diluted with water (or used at full strength) and applied or incorporated in the porous bodies. The degree of dilution with water is directly proportional to the degree of protection and may hence be controlled by the user to accomplish the degree of protection desired.

The emulsion concentrate, or a water dilution of the emulsion concentrate, may be applied directly to the surface of the lumber or other cellulose construction material by spray, roller coat, brush or dip application. The emulsion penetrates effectively into the wood or cellulose surface and becomes incorporated in and associated with the surface fibers of the matrix. The solvent (water) will be lost by rapid evaporation, which results in an immediate break-down of the emulsion. The organic solids phase of the emulsion remains incorporated in the surface fibers of the cellulose. Then follows a break-down of the surface active agent—the amine component being either fugitive and lost by volatilization or reacting chemically with the cellulose.

This results in a layer of the very desirable remaining organic solids within the surface of the wood, which is entirely hydrophobic. Thus, a protective film is provided in a relatively short period of time, depending upon the temperature and relative humidity of the environment. There is a subsequent curing of the protective layer of the reactive polymer, greatly increasing the imperviousness of the layer to water. The biocidal agent in the emulsion remains in the surface of the cellulose product.

It is known in the art that oil-in-water emulsions can be manufactured by several different techniques. The recommended method of manufacture of this invention is by the water-to-oil technique; however, any other acceptable emulsion manufacturing method, such as oil-to-water or the pressure method can be used satisfactorily.

It is also known in the art that it is possible to coat or impregnate porous bodies as well as fibrous substances with various materials which include wax-resin emulsions. While these materials have functioned to secure many desirable features, they have exhibited one or more disadvantages. These disadvantages include lack of paintability of the substrate, lack of permanence of water repellent protection, poor water repellent effectiveness and staining of the impregnated substrate by micro-organisms. The composition of the present invention is extremely desirable for the protection of cellulose products such as lumber from the mill, as these products pass through the shipping stages and to their ultimate construction use or other uses. Furthermore, due primarily to the reactive polymer present in the composition of the present invention, the disadvantages normally associated with products of this type are greatly reduced.

In essence, the composition of the present invention is an oil-in-water emulsion concentrate which may thereafter be diluted with additional water prior to its application on a cellulose material to be protected. The present oil-in-water emulsion is particularly effective as a water repellent and comprises a semi-penetrating water repellent fungicide for application on the cellulose products at the mill. The composition controls rapid pickup and loss of moisture in the wood, which is one of the primary causes of weather damage. Thus, the present composition maintains a relatively uniform moisture content in the wood.

As pointed out heretofore, the present composition is an oil-in-water emulsion which comprises a paraffin wax, a petrolatum wax, a reactive polymer, a fatty acid ester and orthophenylphenol, emulsified with an amine fatty acid soap. However, the preferred emulsion compositions are those which contain additional ingredients.

By way of illustration, and not of limitation, a particularly desirable mixture of ingredients to be emulsified in accordance with the present invention, are as follows:

| Ingredients: | Range, wt. percent |
|---|---|
| Paraffin wax | 4–7 |
| Petrolatum wax | 3–6 |
| Reactive polymer | 4–7 |
| Terpene solvent | 1–3 |
| Orthophenylphenol | 1–3 |
| Fatty acid | 3–5 |
| Amine | 1–5 |
| Water dispersible lecithin | .5–1 |
| Pentaerythritol-fatty acid ester | 2–4 |
| Urea | 2–5 |
| Water | 60–75 |

As pointed out heretofore, protective concentrate is an oil-in-water emulsion, wherein the amount of water present in the concentrate may vary from about 60–70% and higher. A desirable specific concentrate composition, for example, is one which has about 64% water present. Under these conditions a desirable concentrate would have the following composition:

| Ingredients | Weight percent |
|---|---|
| Paraffin wax [1] | 6.29 |
| Petrolatum wax [2] | 4.71 |
| Reactive polymer [3] | 6.15 |
| Pine oil [4] | 1.51 |
| Orthophenylphenol [5] | 2.05 |
| Fatty acid [6] | 4.27 |
| Ammonium hydroxide 28% [7] | 4.38 |
| Water dispersible lecithin [8] | .62 |
| Pentaerythritol-fatty acid ester [9] | 3.17 |
| Urea | 3.08 |
| Water | 63.78 |
| Total | 100.00 |

[1] Paraffin wax—120/150° F. AMP (American Melting Point), white crude scale wax, having a flash point of 410° F. minimum, a penetration of 40/50, a viscosity at 210° F. of 39/40, an oil content (A.S.T.M.) of 1.5 maximum, and a color (Saybolt) of +25.
[2] Petrolatum wax—a technical amorphous petrolatum with a Saybolt melting point of 120/140° F., an A.S.T.M. consistency of 150–180, a Saybolt viscosity at 210° F. of 105, and a dark brownish color.
[3] Reactive polymer—a reactive polymer of diolefins and olefins, a viscosity (SSU/210° F.) of 100–250, an iodine number of 240, a flash point (Cleveland open cup) of 240° F. minimum, and an ash content of .2%. This material available from Enjay Chemical Company by trademark CTLA polymer.
[4] Pine oil—a special synthetic pine oil, having a refractive index at 20° F. of 1.480, a color Saybolt of +17, a flash point (Cleveland open cup) of 170° F., total alcohols of 73% and an A.S.T.M. distillation range of 197° C.–222° C.
[5] Orthophenylphenol—a biocide having the chemical formula C₆H₄(C₆H₅)OH, with a molecular weight of 170.2, freezing point of 57° C., boiling point of 286° C., flash point 255° F., fire point of 300° F.
[6] Fatty acid—preferred are the C₉–C₁₉ acids (lauric, oleic palmitic, stearic acids, etc.).
[7] Ammonium hydroxide 28%—an ammonium hydroxide solution containing 29.4–29.8% NH₃ with gravity of 26.0° Bé.
[8] Water dispersible lecithin—lethicin having 49% acetone insolubles, an acid value of 22–31, and a color maximum of 12 Gardner. A typical product is Kelecin 1080 from Spencer-Kellogg Corporation.
[9] Pentaerythriol-fatty acid ester—a reaction product between a fatty acid and pentaerythritol alcohol, having an acid number of 25 maximum, of Gardner color of 100 maximum, and a Gardner-Holt viscosity of G-K.

The concentrate is very effective in the treatment of other fibrous materials such as gypsum board or plaster board or paper facing for this type board to render the same water repellent and water retardant.

When the concentrate, as described above, is mixed with about one to six or more parts of water, and when used in the treatment of paper, the resistance of the paper toward water absorption is raised to a high degree, without interfering with the drying and adhesion of paint which may later be applied to the paper.

The combination of the ingredients used in the invention are unique and impart desirable properties to the impregnated cellulose substrate that have heretofore been unobtainable with a water emulsion treatment. Although simple wax emulsions are known and used as water repellents, the present unique formultaion imparts a much higher degree of permanency and flexibility within the surfaces of the cellulose product, rather than the mere physical blocking provided by a conventional surface coating.

To illustrate the above and to show the unique effect of the present formulation, the following tests were carried out:

TEST 1

Hydrophobic qualities of the film can be measured by applying a drop of water to a treated cellulosic substrate and measuring the contact angle of the drop of the surface over a specified period of time—the greater the change in the contact angle, the poorer the effectiveness of the treatment. Results are expressed in percent effectiveness.

TEST 2

Wood panels treated by three minute immersion in various test solutions can be measured for paintability by allowing 24 hours dry time and then applying a prime coat and a top coat of the standard exterior paint. Drying time is compared with the dry time of the paint over an untreated panel.

In order to illustrate the unique aspects of the invention, the above tests were carried out with the following results:

EXAMPLE 1

The reactive polymer in the preferred formula was replaced with pentaerythritol ester gum, a hard film-forming resin. This solution was diluted with five parts of water. One set of test specimens was air dried for 24 hours, a second set was heat cured at 240° F. for one hour. Specimens were then subjected to the heretofore mentioned drop angle test (Test 1), with the following results:

| | Percent |
|---|---|
| Preferred formula (air dried) | 60 |
| Preferred formula (heat dried) | 79 |
| Ester gum formula (air dried) | 48 |
| Ester gum formula (heat dried) | 50 |

EXAMPLE 2

The reactive polymer in the preferred formulation was replaced with amorphous polypropylene (Oletak #100, trademark of Sun Oil Company), a resinous material proported to improve water repellent effectiveness in wax emulsions. Dilutions in tests were conducted as in Example No. 1, with the following results:

| | Percent |
|---|---|
| Preferred formulation (air dried) | 60 |
| Preferred formulation (heat dried) | 79 |
| Polypropylene formulation (air dried) | 35 |
| Polypropylene formulation (heat dried) | 35 |

EXAMPLE 3

The reactive polymer in the preferred formulation was replaced with pentaerythritol fatty acid ester. This ester already comprises part of the binder in the preferred formulation and is known in the trade as a good vehicle solid. Dilutions and tests were run as in Examples 1 and 2.

| | Percent |
|---|---|
| Preferred formulation (air dried) | 60 |
| Preferred formulation (heat dried) | 79 |
| Ester formulation (air dried) | 45 |
| Ester formulation (heat dried) | 48 |

EXAMPLE 4

The preferred formulation was diluted with five parts of water and compared in Test 1 with an equal dilution of a commercial wax emulsion (Mobilcer A of Mobil Oil Company), as in Example 1.

|  | Percent |
|---|---|
| Preferred formulation (air dried) | 60 |
| Preferred formulation (heat dried) | 79 |
| Wax emulsion (air dried) | 24 |
| Wax emulsion (heat dried) | 31 |

EXAMPLE 5

The preferred formulation was diluted with five parts of water and compared in Test 1 with a commercial resin wax emulsion designed for the same end application (Millbrite of Chapman Chemical Company).

|  | Percent |
|---|---|
| Preferred formulation (air dried) | 60 |
| Preferred formulation (heat dried) | 79 |
| Millbrite (air dried) | 40 |
| Millbrite (heat dried) | 45 |

EXAMPLE 6

The preferred formulation diluted with five parts of water was compared with the commercial wax resin emulsion (Millbrite, Chapman Chemical Company), in Test 2. Both coats of paint exhibited superior dry and adhesion over the commercial formula, as compared with the commercial product, Millbrite.

Although all of the above test results were obtained with the preferred formulation, experimental formulation varying the range of each ingredient over wider limits, still produced a product with test results comparable to the preferred formulation.

By way of illustration:

| Ingredients: | Range, wt. percent |
|---|---|
| Paraffin wax | 1–10 |
| Petrolatum wax | 0–10 |
| Reactive polymer | –12 |
| Terpene solvent | 0–5 |
| Orthophenylphenol | 1–6 |
| Fatty acid | 3–5 |
| Amine | 1–5 |
| Water dispersible lecithin | .5 |
| Pentaerythritol-fatty acid ester | 0–6 |
| Urea | 2–5 |
| Water | 50–80 |

Application or incorporation of the present emulsion is restricted to cellulose products, both natural and manufactured, that have received no previous treatment in regard to protective coatings such as paint, lacquer, and the like.

By cellulose products, both natural and manufactured, is meant among other materials, dimension wood, lumber, plywood, manufactured hardboard, timber, paper, and especially paper used in the manufacture of construction materials, corrugated board, compressed cellulose fiberboard, and other cellulose products exposed to weather and biological destruction.

By the protection against destruction and degrading of these products is meant protection against warping, splitting and cracking of lumber and the like, by the forces of water; the degrading of lumber and the like by biological staining, mold, mildew and dirt; the swelling, curling and buckling of corrugated board, paper and compressed cellulose fiberboard, by the forces of water. These products are also protected against the loss of tensile strength due to the forces of water penetration and biological invasion.

It is within the concept of the present invention not only to apply the same to porous surfaces but to use a concentrate in the processing of fibrous materials such as in the manufacture of gypsum or plaster board by mixing the concentrate in the mixture and stirring or agitating the same. While the concentrate may be applied to the surface of a laminating paper which has been applied to a core or a base material, it is within the concept of the present invention to apply the coating as an intermediate layer when a plurality of limitations are used. Thus in essence, the mixture or composition of the present invention imparts a high degree of resistivity to the material with which it is used, particularly with respect to its ability to resist moisture and to permit subsequent treating of the base material, as for example, with finishing, painting and the like. Thus, in summary, the emulsion concentrate of the present invention, in essence, comprises a very stable two-phase emulsion. It is not a preservative as defined in the wood preserving industry, but acts to deposit a homogeneous film on the cellulose cell walls as opposed to crystallization of wax crystals or particles in the pores. The reactive nature of this film on the cell walls results in higher resistivity to the degradation of water.

The embodiments of the invention in which an exclusive property or privilege is claimed are defined as follows:

1. An oil-in-water emulsion cellulose treating composition which comprises: about 4% to 7% by weight of a paraffin wax having an AMP melting point in the range from about 120° F. to 150° F., an oil content of 1.5 maximum, and a flashpoint of 410° F. minimum; about 3% to 6% by weight of an amorphous petrolatum wax having a melting point in the range from about 120° F. to 140° F., and an A.S.T.M. consistancy of 150–180; about 4% to 7% by weight of a reactive polymer of diolefins and olefins having a viscosity Saybolt at 210° F. in the range from about 100 to 250, an iodine number of 240 and a flash point of 210° F. minimum; about 2% to 5% by weight of urea; about 3% to 5% by weight of fatty acid having from about 9 to 19 carbon atoms in the molecule; about 1% to 5% by weight of an amine base; and from about 50% to 80% by weight of water.

2. Composition as defined by claim 1 wherein approximately about 6 parts by weight of paraffin wax are used with about 4 parts by weight of petrolatum wax in conjunction with about 4 parts by weight of the fatty acid and with about 6 parts by weight of the reactive polymer.

3. Emulsion as defined by claim 1 wherein said paraffin wax has a melting point in the range from about 120° to 150° F., and an oil content less than about 1.5, said petrolatum wax is an amorphous wax having a melting point in the range from about 120–140° F., and reactive polymers is a reactive polymer of diolefins and olefins having a softening point in the range from about 80° to 212° F.; and wherein said fatty acid is selected from the class consisting of lauric, oleic, palmitic and stearic acids.

4. Composition as defined by claim 3 wherein about 6 parts by weight of paraffin wax are used with about 4 parts by weight of petrolatum wax in conjunction with about 4 parts by weight of fatty acid and with about 6 parts by weight of the reactive polymer.

5. Emulsion as defined by claim 2 wherein said reactive polymer has a flash point in the range of 210° F. minimum, and wherein said fatty acid is selected from the class consisting of lauric, oleic, palmitic, and stearic acids.

6. An oil-and-water emulsion cellulose treating composition concentrate as set forth in claim 1 which comprises a mixture of about 5–7 wt. percent of paraffin wax, about 3.5–5.5 wt. percent of a petrolatum amorphous wax, about 5–7 wt. percent of a reactive polymer characterized by being a polymer of diolefins and olefins, about 1.5–2.5 wt. percent of orthophenylphenol, about 3.5–5.5 wt. percent of a fatty acid selected from the class consisting of lauric, oleic, palmitic and stearic acids, about 2.5–3.5 wt. percent of pentaerythritol fatty acid ester, and about 50 to 80 wt. percent of water.

7. Emulsion as defined by claim 1 wherein said amine base is an emulsifying agent and is in the range of 1–5% by weight, and said paraffin wax has a melting point from about 120 to 150° F., an oil content of 1.5 maximum, and a penetration of 40/50, and said petrolatum wax has a melting point from about 120–140° F., a consistancy from about 150–180, and a viscosity at 210° F. of 105.

8. Emulsion as defined by claim 7 wherein a biocide and a surface active agent is present in said emulsion.

9. An oil-in-water emulsion as set forth in claim 1 for protecting cellulose products such as wood and paper against swelling, shrinkage, fungi, weathering and discoloration, wherein the amount of water present in the concentrate is in the range from about 50% to 80% and having the following composition:

| Ingredients: | Weight percent |
| --- | --- |
| Paraffin wax | 6.29 |
| Petrolatum wax | 4.71 |
| Reactive polymer | 6.15 |
| Pine oil | 1.51 |
| Orthophenylphenol | 2.05 |
| Fatty acid | 4.27 |
| Ammonium hydroxide (28%) | 4.38 |
| Water dispersible lecithin | .62 |
| Pentaerythritol-fatty acid ester | 3.17 |
| Urea | 3.08 |
| Total | 36.23 |

10. An oil-in-water emulsion as set forth in claim 1 for protecting cellulose products such as wood and paper against swelling, shrinkage, fungi, weathering and discoloration, wherein the amount of water present in the concentrate is in the range from about 50% to 80% and comprising the following composition:

| Ingredients: | Range, wt. percent |
| --- | --- |
| Paraffin wax | 1–10 |
| Petrolatum wax | 0–10 |
| Reactive polymer | 2–12 |
| Terpene solvent | 0–5 |
| Orthophenylphenol | 1–6 |
| Fatty acid | 3–5 |
| Amine | 1–5 |
| Pentaerythritol-fatty acid ester | 0–6 |
| Water dispersible lecithin | 0.5–1 |
| Urea | 2–5 |
| Total | 15–65 |

11. Emulsion as defined by claim 1 which contains from about 1 to 10% by weight of paraffin wax; wherein said petrolatum wax is present in a concentration of from about 0–10% by weight and is characterized by being an amorphous wax; wherein said reactive polymer is present in a concentration of about 2–12% by weight and is composed of polymers of diolefins and olefins, and wherein said acid is selected from the class consisting of $C_9$–$C_{19}$ fatty acids.

12. Emulsion as defined by claim 11 wherein said fatty acid is from the class of lauric, oleic, palmitic, and stearic acids.

13. Emulsion as defined by claim 11 which contains from about 1–6% by weight of orthophenylphenol.

14. Emulsion as defined by claim 11 wherein said fatty acid is from the class of lauric, oleic, palmitic, and stearic acids and having about 2% by weight orthophenylphenol.

References Cited

UNITED STATES PATENTS

| | | | |
| --- | --- | --- | --- |
| 3,369,932 | 2/1968 | Sawyer et al. | 260—28.5 X |
| 3,313,755 | 4/1967 | O'Rourke | 260—28.5 |
| 3,085,026 | 4/1963 | Weisgerber et al. | 117—60 |
| 2,737,458 | 3/1956 | Burham | 106—171 |
| 2,546,328 | 3/1951 | Arabian et al. | 106—271 |
| 2,504,920 | 4/1950 | Buckman et al. | 260—28.5 |
| 2,443,221 | 6/1948 | Bergstein | 117—158 |
| 1,948,442 | 2/1934 | Ellis | 260—23 X |

DONALD E. CZAJA, Primary Examiner

C. W. IVY, Assistant Examiner

U.S. Cl. X.R.

106—2; 117—148, 155; 162—161, 69; 260—28.5, 29.7